United States Patent [19]

Ors et al.

[11] Patent Number: 5,629,187

[45] Date of Patent: *May 13, 1997

[54] PROCESS AND APPARATUS FOR FORMING SOLID PARTICLES BY CROSS-LINKING DROPS OF A CROSS-LINKABLE MATERIAL WITH A CASCADING STREAM OF CROSS-LINKING AGENT

[75] Inventors: Patrick Ors; Dominique Hennequin, both of Epernay; Alain Meybeck, Courbevoie, all of France

[73] Assignee: LVMH Recherche, Colombes, France

[*] Notice: The term of this patent shall not extend beyond the expiration date of Pat. No. 5,484,721.

[21] Appl. No.: 479,182

[22] Filed: Jun. 7, 1995

Related U.S. Application Data

[63] Continuation of Ser. No. 39,286, Apr. 19, 1993, Pat. No. 5,484,721.

[30] Foreign Application Priority Data

Oct. 19, 1990 [FR] France ................... 90 13002

[51] Int. Cl.$^6$ ............ C12N 11/00; C12N 11/10; C12M 1/00; C12M 1/40
[52] U.S. Cl. ............ 435/178; 264/4; 424/489; 426/11; 426/15; 435/174; 435/182; 435/283.1
[58] Field of Search .................. 435/174, 178, 435/182, 288, 287; 426/11, 15; 424/489; 264/4

[56] References Cited

U.S. PATENT DOCUMENTS

| | | | |
|---|---|---|---|
| 4,352,883 | 10/1982 | Lim | 435/178 |
| 4,800,160 | 1/1989 | Iguchi et al. | 435/177 |
| 4,828,997 | 5/1989 | Yamaguchi et al. | 435/178 |

FOREIGN PATENT DOCUMENTS

| | | |
|---|---|---|
| 0289648 | 11/1988 | European Pat. Off. . |
| 0173915 | 8/1992 | European Pat. Off. . |
| 2192171 | 1/1988 | United Kingdom . |

*Primary Examiner*—David M. Naff
*Attorney, Agent, or Firm*—Bryan Cave LLP

[57] ABSTRACT

A process and apparatus are provided for making solid Particles from an ionically cross-linkable material by cross-linking drops of the material with a cross-linking agent in the form of a falling stream. In one embodiment, a stream of the cross-linking agent flows down the inner walls of an enclosure and drops of the material are directed to the stream of cross-linking agent. In another embodiment, a stream of the cross-linking agent is free-falling by gravity in a cascade without contacting any surface and drops of the material are directed to the stream of cross-linking agent. Solid particles are separated from the cross-linking agent at about the bottom of the enclosure or at about the bottom of the cascade. The drops of cross-linkable material are directed at the stream of cross-linking agent preferably at an angle of incidence of less than 90° such as between 5° and 45° and most preferably between 15° and 30°. Particles having a size of 10 μm to 4 mm may be produced. Double layer particles can be produced by using a double nozzle constituted by two concentric orifices. The cross-linkable material may be alginic acid and the cross-linking agent may be a divalent cation such as calcium. Particles containing micro-organism cells may be obtained by combining micro-organism cells with the cross-linkable material before drops are formed. In a preferred embodiment, particles are produced containing *Saccharomyces cerivisiae* for making sparking wines.

46 Claims, 2 Drawing Sheets

PROCESS AND APPARATUS FOR FORMING SOLID PARTICLES BY CROSS-LINKING DROPS OF A CROSS-LINKABLE MATERIAL WITH A CASCADING STREAM OF CROSS-LINKING AGENT

This is a continuation of U.S. application Ser. No. 08/039,286, filed Apr. 19, 1993, now U.S. Pat. No. 5,484,721.

BACKGROUND OF THE INVENTION

1. Field of the Invention

The present invention essentially relates to a process and apparatus for manufacturing solid particles from an ionically cross-linkable material in the presence of an ionic cross-linking agent, with high yields.

2. Description of the Related Art

Various processes of manufacturing solid particles, advantageously in substantially spherical form, thus constituting balls, from a solidifiable material originally in a form capable of flowing, are known. According to the prior art, the generation of drops of this material and the solidification thereof by contacting a solidifying agent, is usually provided. This technique is in particular used for the immobilization of a micro-organism by inclusion in the material. The immobilized micro-organisms may serve to produce fermented drinks such as wine and beer (FR-A-2 320 349 and FR-A-2 359 202). Their use has also been proposed for conventional champagnization (FR-A-2 432 045) as well as for making sparkling drinks with variable degrees of alcohol (FR-A-2 601 687). These publications, as well as others (in particular JP-A-57-150 385 or EP-A-173 915) have emphasized the performance of reactors with immobilized cells. FR-A-2 600 673 or FR-A-2 586 256 or EP-A-388 588 may also be cited as other documents.

These techniques have rendered possible the production of fermentations with mixtures of micro-organisms of different categories (mixtures of lactic bacteria and mixtures of yeasts).

However, the implementation of the process at an industrial level has encountered the difficulty of having sufficient quantities of particles produced at a high rate at low cost, and presenting a substantially spherical shape with a relatively homogeneous diameter.

In fact, according to the majority of known techniques, the solidifiable material is dropped in the form of drops in a liquid solidifying agent, generally contained in a tank, in a substantially vertical direction. The drawback of this system is that with the drops all dropping at the same spot on the surface of the solidifying liquid, the balls formed tend to agglomerate together in an indissociable mass. It has been sought to avoid this phenomenon by producing a vortex in the tank for receiving the drops containing the liquid solidifying agent, by circular stirring. However, the success of this operation is only partial since, as soon as the dropping rate of the drops on the one hand and the concentration of the balls already formed in the solidifying liquid on the other hand, are too high, the phenomenon of agglomeration of the balls cannot be totally avoided. In this way, the rate of producing the balls is generally limited, all the more so as these techniques impose a discontinuous production. This therefore constitutes a serious drawback for production on an industrial scale.

Furthermore, by these known techniques there appears another important drawback concerning the regularity of the shape of the balls. Upon the impact of a drop of the solidifiable material on the surface of the liquid solidifying agent, a certain crushing of this drop may be produced. This phenomenon is all the more detrimental in the case of the preparation of multi-layer balls, such as those described in document EP-A-173 915 in Example 5, page 14, as an irregularity in the thickness of the layers may be produced.

The present invention thus has for an object to solve the new technical problem consisting in providing a solution for manufacturing solid particles from an ionically cross-linkable material by contacting with an ionic cross-linking agent, at high rate, at a low cost, with the obtaining of particles of regular, substantially spherical shape, of relatively homogeneous mean diameter.

A further object of the present invention is to solve the new technical problem set forth above in particularly simple manner, making it possible to include micro-organism cells at high rate, without being detrimental to the activity of said cells, which constitutes an essential condition for the use of these particles containing included micro-organisms within the framework of fermentation processes, and particularly within the framework of the preparation of fermented or refermented drinks.

The present invention also has for its object to solve the new technical problems set forth above, with a solution which enables the ionic cross-linking time of the material to be adjusted extremely precisely and allowing a great versatility in the manufacture of particles having a diameter varying within broad limits.

Yet another object of the present invention is to solve the new technical problems set forth above, with a solution which allows recovery of the ionic cross-linking agent and recycling thereof.

These technical problems are solved simultaneously for the first time by the present invention in extremely simple, inexpensive manner, usable on an industrial scale.

SUMMARY OF THE INVENTION

According to a first aspect, the present invention thus provides a process for manufacturing solid particles, advantageously of substantially spherical shape, thus constituting balls, from an ionically cross-linkable material originally in liquid form, comprising the generation of drops of this material and the solidification of this material by contacting it with an ionic cross-linking agent capable of flowing, characterized in that the ionic cross-linking agent is made to flow in the form of a fluid bed, the drops of the ionically cross-linkable material are directed onto said fluid bed, to provoke ionic cross-linking thereof, thus forming said solid particles, and the solid particles thus formed are separated from the ionic cross-linking agent.

According to a particular embodiment, the drops of the ionically cross-linkable material are directed on the fluid bed at an angle of incidence less than 90°.

According to a variant embodiment, the size of the solid particles is adjusted so as to be included between 10 μm and 4 mm.

According to a variant embodiment of the process according to the invention, the cross-linking agent is made to flow in the form of a fluid bed flowing on the inner walls of an enclosure, the drops of the ionically cross-linkable material are directed on said fluid bed, and the solid particles formed are separated from the ionic cross-linking agent, at the bottom of, or after, said enclosure.

According to another embodiment of the process according to the invention, the ionic cross-linking agent is made to flow in the form of a fluid bed dropping freely in cascade, the drops of the ionically cross-linkable material are directed on said fluid bed, particularly in the vicinity of the beginning of said cascade, and the solid particles formed are separated from the ionic cross-linking agent, at the bottom of, or after, said cascade.

In the embodiment described previously, the angle of incidence at which the drops of the ionically cross-linkable material are directed on said fluid bed is preferably between 5° and 45° and more preferably between about 15° and 30° about.

According to a particularly advantageous embodiment of the invention, the said separation of the solid particles is effected by causing the fluid bed of ionic cross-linking agent to flow on a filter of which the meshes are provided to retain the solid particles formed and to filter the liquid ionic cross-linking agent. Said filter is preferably formed by a "foraminated" conveyor belt, constituted in particular by a glass fiber cloth, which makes it possible to evacuate the solid particles formed towards a site for subsequent treatment.

According to another advantageous variant embodiment of the invention, the said conveyor belt terminates at the entrance of a washing device to eliminate the traces of ionic cross-linking agent remaining on said solid particles.

In particular, for carrying out the process of the invention, the ionically cross-linkable material may be constituted by: an aqueous solution of an alkali metal or ammonium salt of alginic acid or of pectic acid, the cross-linking agent comprises a divalent cation such as the calcium ion, or an aqueous solution of iota or kappa carragheenan, and in this case, the cross-linking agent comprises the potassium ion.

An aqueous solution of alkaline alginate is preferably used, such as sodium alginate or potassium alginate, the solidifying agent being an aqueous solution of calcium salt such as calcium chloride.

The respective concentrations of the aqueous solutions of alkaline alginate and of calcium chloride are described in the documents mentioned above, particularly in document FR-A-2 432 045, here incorporated by reference. They are advantageously included between 1% and 1.8% by weight for the alkaline alginate and between 6% and 15% by weight for the calcium chloride.

According to a particularly advantageous characteristic, the total duration of contact of the alginate balls with the calcium salt solution, is included between 18 and 35 minutes.

Said ionically cross-linkable material may contain various products, particularly in suspension or in solution, such as natural macromolecules, in particular enzymes, aromas, living cells.

According to a particular variant embodiment, the ionically cross-linkable material contains a micro-organism, particularly a micro-organism of fermentation, or living animal or vegetable cells, said ionically cross-linkable material being a material compatible with a fermentation medium, in particular an alcoholic fermentation medium in the domain of oenology, preferably constituted by wine, for the production of sparkling or effervescent products, in particular champagne.

According to a particular embodiment of the invention, the micro-organism is a yeast, in particular of the Saccharomyces, Schizosaccharomyces genus.

According to yet another advantageous variant embodiment of the process according to the invention, a gel is prepared, having a so-called "double layer" structure comprising an inner layer, or core, of gel containing the cells or micro-organisms and an outer layer, or envelope, of gel substantially bereft of micro-organisms. The thickness of the outer layer or envelope, in the case of "double layer" balls having an outer diameter of about 2 mm after cross-linking, is advantageously less than 0.8 mm.

In order to obtain particles having a double layer structure, the prior known processes may be used, such as described for example in document JP-A-57-150 385 mentioned above, preferably using the process described in that document, comprising forming the outer layer or envelope with a gelifiable solution. The technique described in document U.S. Pat. No. 4,386,895 or U.S. Pat. No. 3,396,116, or EP-A-0 140 336 or U.S. Pat. No. 3,015,128 or U.S. Pat. No. 3,310,612 may also be used, or the techniques of preparation of inclusion described in an article by P. G. Krouvel in Biotechnology and Bioengineering (1980), vol. 22, page 681 or the document Microcapsules processing and technology (Asaji Kondo) 1979, pages 62 to 66.

According to another advantageous characteristic of the process according to the invention, a recycling of the ionic cross-linking agent is effected by circulation in closed circuit possibly with the addition of fresh ionic cross-linking agent and/or separation of impurities.

The size of the solid particles obtained by carrying out the invention may vary within a wide range, namely from some micrometers to some millimeters, and essentially depends on the viscosity of the ionically cross-linkable material, its supply pressure and the mode of generating the drops, in particular the diameter of the orifice of the drop generating device. The man skilled in the art will readily understand that the finest particles will be obtained by pulverization of the ionically cross-linkable material inside said enclosure, while the largest particles will preferably be obtained by means of a nozzle allowing the ionically cross-linkable material to flow drop by drop. More precisely, the size of the solid particles will be adjusted so as to be included between about 10 µm and 4 mm.

In the case of balls containing cells or micro-organisms such as yeasts, the size thereof will be adjusted to be preferably between 1.5 mm and 3 mm after cross-linking.

In the case of balls intended to be incorporated in cosmetic compositions intended in particular for skin care or make-up such as emulsions, gels, lipsticks, balls of small sizes, preferably between 10 µm and 200 µm are advantageously used.

According to a second aspect, the present invention also provides an apparatus for manufacturing solid particles, advantageously of substantially spherical shape, thus constituting balls, from an ionically cross-linkable material originally in liquid form, comprising means for generating drops of this material and means for contacting this material in drops with an ionic cross-linking agent capable of flowing, characterized in that it comprises means for causing the ionic cross-linking agent to flow in the form of a fluid bed, said means for generating the drops of ionically cross-linkable material being capable of directing the drops on said fluid bed, thus to form solid particles and means for separating the solid particles formed from the ionic cross-linking agent.

According to a particular embodiment, the drops of ionically cross-linkable material are directed on the fluid bed at an angle of incidence less than 90°.

According to a variant embodiment of the apparatus according to the invention, the means for causing the ionic cross-linking agent to flow in the form of a fluid bed effect a flow of the fluid bed on the inner walls of an enclosure, the means for generating the drops of ionically cross-linkable material are capable of directing said drops on said fluid bed, and the said separation means effect a separation of the solid particles from the ionic cross-linking agent, in the vicinity of the bottom of, or after, said enclosure.

According to another advantageous variant embodiment of the apparatus according to the invention, the means for generating the drops of ionically cross-linkable material comprise a pulverization device, advantageously associated with a device for supplying said material under pressure.

According to another embodiment of the apparatus according to the invention, the means for causing the ionic cross-linking agent to flow in the form of a fluid bed effect a flow of the fluid bed in free fall in the form of a cascade, the means for generating the drops of ionically cross-linkable material are capable of directing the drops on said fluid bed, particularly in the vicinity of the point of fall of the fluid bed in cascade and the said separation means effect a separation of the solid particles from the ionic cross-linking agent, in the vicinity of the bottom of, or after, the cascade.

In the embodiment described previously, the angle of incidence at which the drops of the ionically cross-linkable material are directed on said fluid bed is preferably included between 5° and 45° and most preferably between about 15° and 30°.

According to another advantageous variant embodiment of the invention, the said means for separating the solid particles comprise a filter of which the meshes are provided to retain the solid particles formed and to filter the liquid ionic cross-linking agent.

This filter is advantageously formed by a "foraminated" conveyor belt constituted in particular by a glass fiber cloth, which makes it possible to evacuate the solid particles towards a site for subsequent treatment.

According to another advantageous variant embodiment of the apparatus according to the invention, said conveyor belt terminates at the entrance of a washing device for eliminating traces of ionic cross-linking agent remaining on said particles.

Advantageously, the conveyor belt is inclined so that the displacement of the solid particles is slightly upward, which promotes the elimination by gravity of the liquid ionic cross-linking agent which flows in the opposite direction, downwardly.

According to another particularly advantageous embodiment of the apparatus according to the invention, it comprises means for recycling the ionic cross-linking agent, particularly by circulation in closed circuit, possibly with the addition of fresh ionic cross-linking agent and/or separation of impurities.

According to another advantageous characteristic of the apparatus according to the invention, the drop generating means comprises means for generating double-layer drops. These means for generating double-layer drops preferably comprise a double nozzle constituted by two concentric tubes defining two concentric orifices, an inner orifice, an outer annular orifice surrounding the inner orifice, and separate means for supplying a first solution of ionically cross-linkable material preferably containing in suspension living animal or vegetable cells or micro-organisms particularly micro-organisms of fermentation, from a reserve in said inner orifice, means for supplying a second solution of an ionically cross-linkable material from another reserve in the outer annular orifice, said second solution preferably being bereft of cells or micro-organisms.

According to another particularly advantageous characteristic of the apparatus according to the invention, it comprises vibrating means for facilitating and accelerating the formation of said drops, particularly vibrating means of the type described in FR-A-2 336 178.

According to yet another advantageous characteristic of the apparatus according to the invention, it is characterized in that it comprises, if necessary, temperature regulating means adapted to maintain the ionically cross-linkable material in the fluid state to allow the generation of drops of said material.

Finally, according to a third aspect, the present invention also covers the use of the solid particles as manufactured by the process or the apparatus set forth hereinabove, in a process of fermentation, particularly for obtaining wines, in particular effervescent wines, and particularly champagne, the size of said particles preferably being selected so as to be included between 1.5 mm and 3 mm after cross-linking.

According to yet another aspect, the present invention also covers the use of the solid particles as manufactured by the process or apparatus described hereinabove, by ionic cross-linking, for the preparation of cosmetic compositions for skin care or make-up, of food compositions such as artificial salmon eggs, of compositions for agriculture such as coated forms of pesticides, or artificial seeds by encapsulation or coating of embryos of plants.

According to a particular variant embodiment of this cosmetic, food or agricultural use, the solid particle is composed of a solid support such as a pigment or a microball, coated with the ionically cross-linked material.

According to another particular variant embodiment of this cosmetic, food or agricultural use, the solid particle is composed of a central liquid core surrounded by ionically cross-linked material prepared by using the double nozzle mentioned above whose inner orifice receives the liquid to be contained. This liquid may be an aqueous solution which is then surrounded by ionically cross-linked material.

In particular, the size of the particles is selected so as to be included between 10 μm and 200 μm.

It is thus appreciated that the invention makes it possible to solve the new technical problems set forth hereinbefore in a particularly simple, inexpensive manner, usable on an industrial scale. In particular, the invention makes it possible to manufacture, continuously and at a high rate, solid particles of regular, substantially spherical form, possibly being able to include various products such as pigments, micro-balls, enzymes, aromas, living cells or microorganisms. Moreover, the present invention makes it possible to avoid adhesion of these particles to one another or to the walls of the apparatus at the moment of solidification thereof.

In this respect, it will be noted that, in the case of solidification of the balls by cross-linking, in particular in the case of formation of a gel of calcium alginate, it has been surprisingly observed that the very brief time, of the order of a fraction of a second, of the passage in the fluid bed of the drop of solidifiable material, in the present case a drop of aqueous solution of alkaline alginate, was sufficient to give the outer layer of the ball being formed a sufficient hardness to avoid it adhering to the other balls already formed on which it drops, particularly at the level of the separation means.

Other objects, characteristics and advantages of the invention will clearly appear to the man skilled in the art from the following explanatory description with reference to two presently preferred embodiments of the apparatus according to the invention, making it possible to carry out the process according to the invention described hereinbefore, given simply by way of illustration and which can in no way limit the scope of the invention.

DETAILED DESCRIPTION OF THE INVENTION

Figure 1:
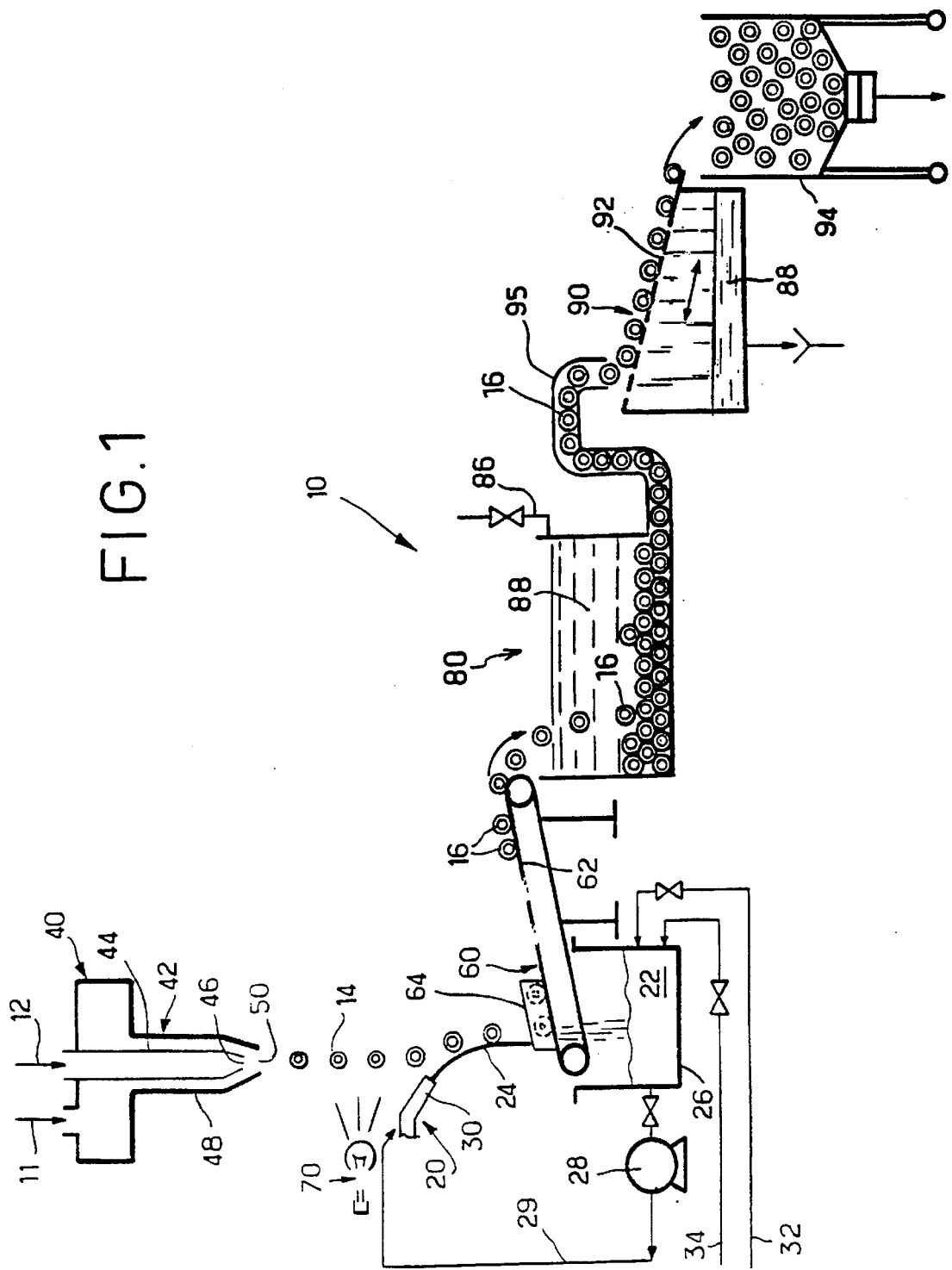
FIG. 1 schematically shows, in a first embodiment, an apparatus for manufacturing solid particles according to the invention.

With reference to the accompanying FIG. 1, an apparatus according to the invention is represented by general reference numeral 10. This apparatus makes it possible to manufacture solid particles 16, advantageously of substantially spherical shape, thus constituting balls, from an ionically cross-linkable material supplied for example via conduits 11, 12, originally in a liquid form.

The apparatus according to the invention is characterized in that the solidifiable material comprises an ionically cross-linkable material and in that it comprises means 20 for causing an ionic cross-linking agent 22 to flow in the form of a fluid bed 24; means 40 for causing the ionically cross-linkable material 11, 12 to flow as drops 14 on said fluid bed 24, to provoke ionic cross-linking of the drops 14 in order to form the particles 16 in the form of balls, as well as means 60 for separating the particles 16 from the ionic cross-linking agent 22.

Means 20 for causing the ionic cross-linking agent 22 to flow in the form of a fluid bed 24 comprise means 28, such as a pump, for transferring said agent from a storage reservoir 26 via a conduit 29 and for example a trough 30 allowing the ionic cross-linking agent 24 to fall freely in a cascade, as shown.

Means 32, 34 may be provided for supplying constituents of the ionic cross-linking agent. The ionic cross-linking agent to effect cross-linking of the ionically cross-linkable material being for example sodium or potassium alginate. Means 32 may bring calcium chloride in concentrated aqueous solution and means 34 dilution water. Alternately means 34 may serve to empty the reservoir 26 for total replacement of the solidifying agent.

The means 40 for causing the ionically cross-linkable material 11, 12 to flow in drops advantageously comprise a double nozzle 42 comprising an inner conduit 44 defining an inner orifice 46 and an outer conduit 48 defining an outer annular orifice 50 surrounding the inner orifice 46, as is clearly visible in the accompanying Figure. Means for supplying the ionically cross-linkable inclusion material such as an aqueous solution of sodium or potassium alginate 12 preferably containing in suspension micro-organisms such as yeasts, from a reserve (not shown) via conduit 12 to the inner orifice 46 are provided, as well as means for supplying the ionically cross-linkable material bereft of cells or micro-organisms, from another reserve (not shown) via conduit 11 to the outer annular orifice 50, are also provided. The drop generating means 40 advantageously comprise vibrating means (not shown), for example as described in FR-A-2 330 676, to facilitate and accelerate the generation of the drops 14, when it is desired to obtain a high flowrate of these drops. Means for measuring the flowrate of the drops 14 may also be provided, particularly comprising an optical measuring device 70 well known to the man skilled in the art.

The separation means 60 preferably comprise a filter 62 of which the meshes are provided to retain the solid particles formed and to filter the liquid ionic cross-linking or gelling agent 22. This filter is preferably formed by a "foraminated" conveyor belt, slightly inclined as shown, which makes it possible to evacuate the solid particles 16 towards a site for subsequent treatment advantageously comprising a washing device 80 for eliminating traces of ionic cross-linking agent 22 remaining on the surfaces of the solid particles 16. The separation means 60 preferably likewise comprise a device 64 intended to maintain on the filter 62 the balls collected at the base of the fluid bed 24. The device 64 is for example constituted by a piece in the form of a U maintained recumbent in the vicinity of the conveyor belt forming filter and open in the direction of displacement of the balls on the filter. The washing device 80 may be of any type. Such devices are well known to the man skilled in the art. Means such as 86 for supplying washing liquid 88 are also provided. The solid particles 16 thus washed are then sent for example, through the siphon 95 on a draining device 90, for example comprising a fixed inclined grating 92, to filter the washing liquid 88 which is then evacuated for example to the drains, as is symbolically shown in the accompanying Figure. The solid particles preferably essentially spherical, in the form of balls, thus washed and filtered are then sent into a storage reservoir 94, awaiting subsequent use. In the case of these solid particles containing cells of micro-organisms of fermentation, these balls may be used for obtaining wine, in particular sparkling wine, particularly champagne, by fermentation. As indicated above, the solidifiable material may be constituted by an ionically cross-linkable material, for example by the calcium ion. A preferred ionically cross-linkable material is an alkaline alginate, preferably sodium alginate or potassium alginate. The ionic cross-linking agent is in that case constituted by an aqueous solution of calcium chloride, as is well known to the man skilled in the art.

An example of industrial manufacture of particles 16 in the form of double-layer balls of which the inner layer or core contains cells of micro-organisms and the outer layer is essentially bereft of micro-organisms, is now described in the following Example.

Example of Preparation According to the Invention with the Apparatus of FIG. 1

A first solution of sodium alginate at 1.5% by weight is prepared, by mixing 150 g of sodium alginate in 10 l of demineralized water, in which are placed in suspension the cells of micro-organisms, for example yeasts of fermentation for the manufacture of sparkling wines such as cells of *Saccharomyces cerivisiae* marketed by the Institut Eonologique de Champagne, which are brought, as symbolized by arrow 12, in the inner orifice 46 of the drop generating means 40.

A second solution of sodium alginate at 1.5% by weight is prepared by mixing 150 g of sodium alginate for 10 l of demineralized water, without cells, as symbolized by arrow 11, in the outer orifice 50 of the drop generating means 40.

Furthermore, there is introduced in the reservoir 26 the cross-linking, solidifying agent, constituted by an aqueous solution of calcium chloride at 10% by weight. This solution is pumped by means of pump 28 and flows via trough 30 in free fall in the form of a cascade from a height of about 15 cm.

The position of the drop generating means 40 is adjusted so that the drops fall near the point of fall of the fluid bed, i.e. towards the upper part of the cascade, at an angle of incidence included between 5° and 45° and preferably equal to about 30°.

As soon as the drops of sodium alginate solution contact the sodium chloride solution, there is produced a rapid rigidification of the drops by reason of a peripheral cross-linking which then propagates towards the core of the ball. The size of these balls is very homogeneous and lies at about 2 mm.

The balls thus formed are separated from the cross-linking agent 22 by the separation device 60, particularly by filtration with the aid of the filter 62 formed by a foraminated conveyor belt. It should be noted that, during the path over the surface of the separation means 60, cross-linking of the solid particles 16 continues thanks to the presence of traces of cross-linking agent on their surface. The solid particles 16 are then transferred into the washing device 80 where they are washed with a washing liquid such as demineralized water. The period between the impact of the drops 14 on the fluid bed 24, and of the transfer of the solid particles 16 in the washing device 90 is of the order of 25 mins. The washed solid particles 16 are filtered on the filtration device 90 and are then directed into the storage device 94. It will thus be appreciated that the apparatus according to the invention makes it possible to manufacture solid particles at a high rate, in a procedure which makes it possible to adjust very precisely the cross-linking time as it will be understood that it is very easy, according to the invention, to adjust the time of passage of the drops 14 from the moment when they to contact the liquid 24 at the top of the cascade and the moment when they arrive in the washing device 80. This cross-linking time may be modified as desired particularly by varying the speed of advance of the conveyor belt 62. It will thus be understood that the invention leads to determining technical advantages with respect to the prior state of the art.

Figure 2:
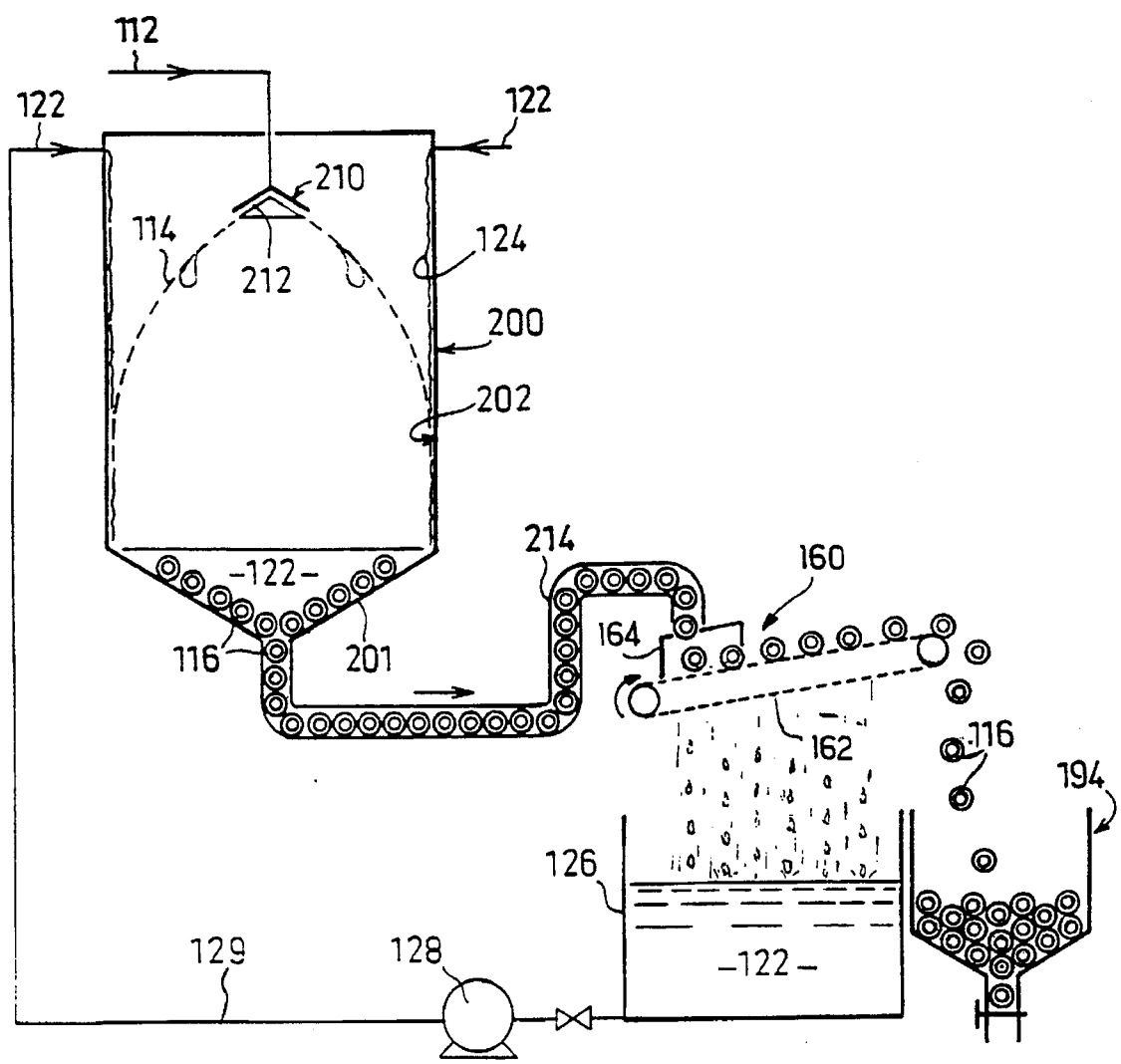
FIG. 2 likewise schematically shows, in a second embodiment, an apparatus for manufacturing solid particles according to the invention.

With reference to FIG. 2, a second embodiment of an apparatus according to the invention has been shown, for which the same reference numerals used in FIG. 1 (increased by 100 for like parts) have been used.

Thus, the ionically cross-linkable material is referenced 112. This ionically cross-linkable material is brought into an enclosure 200 inside which it is directed in the form of drops 114 on the inner walls 202 of the enclosure 200, for example by the use of a flow or pulverization device 210, capable of directing as desired the drops 114 against the inner walls 202 of the enclosure 200. This flow or pulverization device 210 may be designed to make it possible to adjust the angle of incidence of the drops 114 against the inner walls 202 of the enclosure 200, said angle of incidence being less than 90°. Such flow or pulverization devices 210 are well known to the man skilled in the art.

Furthermore, the ionic cross-linking agent 122 is made to flow in the form of a fluid bed or film 124 on the inner walls 202 of the enclosure 200. The ionic cross-linking agent may also be recycled via conduit 129 in manner similar to the recycling device of FIG. 1.

According to an advantageous variant embodiment, the enclosure 200 presents a substantially cylindrical shape disposed vertically and of which the lower part is shaped as a funnel 201 to collect the solid particles 116 in the ionic cross-linking agent 122. These solid particles 116 in the ionic cross-linking agent 122 may be evacuated under the effect of gravity for example by a siphon system 214, thereafter to pass over a filter 162 similar to filter 62 of FIG. 1 and disposed in similar manner, being for example advantageously formed by a foraminated conveyor belt so as to separate the ionic cross-linking agent 122 and to collect the solid particles 116. Near the filter 162 may be maintained a device 164 performing the same functions as the device 64 of FIG. 1. The particles 116 may then pass in a washing device (not shown in FIG. 2) similar to the washing device 80 of FIG. 1 before passing over a filtration device (likewise not shown in FIG. 2) similar to the device 90 of FIG. 1, before being collected in a storage device 194 similar to the device 94 of FIG. 1.

The same technical advantages are thus obtained as in the case of the embodiment of FIG. 1.

In addition, according to this embodiment, an ionic cross-linking agent 122 may be used alone or with a solid support such as a pigment or a micro-ball which it is desired to coat with a product with a low melting point which tends to adhere to the walls. In addition, this device makes it possible to use a large variety of ionically cross-linkable materials.

The invention naturally includes all the means constituting technical equivalents of the means described as well as their various combinations.

We claim:

1. A process for manufacturing solid, unagglomerated particles of materials hardened by cross-linking, which comprises:

(a) providing an ionically cross-linkable material initially in liquid form;

(b) providing an ionic cross-linking agent capable of continuous flow;

(c) producing a freely flowing stream of the ionic cross-linking agent in an essentially vertical, downward direction over a predetermined length until said stream reaches a terminal downstream end, and said flowing stream having an essentially vertical exposed outer surface along substantially the full length of said flowing stream including said terminal downstream end;

(d) generating drops of the ionically cross-linkable material;

(e) directing the drops of the ionically cross-linkable material into contact with the outer surface of the flowing stream of the ionic cross-linking agent such that said drops flow essentially vertically downward in contact with said flowing stream for a period of time effective to cross-link and harden the outer layers of said drops to form said particles; and (f) after forming said particles, immediately separating said particles from the flowing stream of the ionic cross-linking agent at no lower than the terminal downstream end of said flowing stream.

2. The process of claim 1, wherein said drops are directed into contact with the surface of the flowing stream at the vicinity of the top thereof.

3. The process of claim 1, wherein the drops of the ionically cross-linkable material are directed into contact with the surface of the flowing stream of the ionic cross-linking agent at an angle of incidence of less than 90°.

4. The process of claim 1, wherein the drops of the ionically cross-linkable material are directed into contact with the surface of the flowing stream of the ionic cross-linking agent at an angle of incidence ranging between 5° and 45°.

5. The process of claim 1, wherein said ionically cross-linkable material is an alginate salt and said ionic cross-linking agent is a calcium ion solution.

6. The process of claim 1, wherein the drops of the ionically cross-linkable material comprise two layers, the inner of which contains cells of microorganisms and the outer of which is essentially free of such cells.

7. The process of claim 1, wherein the ionically cross-linkable material contains a microorganism for alcoholic fermentation.

8. The process of claim 1, wherein the size of the solid particles is between 10 μm and 4 mm.

9. The process of claim 1, wherein after separation in step (f) from the flowing stream of the ionic cross-linking agent, the solid particles are contacted with a washing solution to remove traces of the ionic cross-linking agent from the surfaces of said particles.

10. The process of claim 1, wherein the ionically cross-linkable material comprises an aqueous solution containing from 1.0% to 1.8% by weight of an alkali metal or ammonium alginate, and the ionic cross-linking agent comprises an aqueous solution containing from 6% to 15% by weight of calcium chloride.

11. The process of claim 1, wherein after separation in step (f) from the flowing stream of the ionic cross-linking agent, the solid particles are contacted with a washing solution to remove traces of the ionic cross-linking agent from the surfaces of said particles, and the period of time, calculated from contacting the cross-linkable material with the cross-linking agent in step (e) up to contacting the solid particles with said washing solution, is controlled to adjust the cross-linking time.

12. A process for manufacturing solid, unagglomerated particles of materials hardened by cross-linking, which comprises:

(a) providing an ionically cross-linkable material initially in liquid form;

(b) providing an ionic cross-linking agent capable of continuous flow;

(c) producing a freely flowing stream of the ionic cross-linking agent in a downward direction over a predetermined length until said stream reaches a terminal downstream end, and said flowing stream having a downwardly directed outer exposed surface along substantially the full length of said flowing stream including said terminal downstream end;

(d) generating drops of the ionically cross-linkable material and directing the drops into contact with the outer surface of the flowing stream of the ionically cross-linking agent such that said drops flow downwardly in contact with said flowing stream to form said solid particles through ionic cross-linking within essentially a fraction of a second after said drops contact the outer surface of the flowing stream; and (e) immediately after forming said particles within essentially a fraction of a second, separating the particles from the flowing stream.

13. The process of claim 12, wherein said drops are directed into contact with the surface of the flowing stream at the vicinity of the top thereof.

14. The process of claim 12, wherein the drops of the ionically cross-linkable material are directed into contact with the surface of the flowing stream of the ionic cross-linking agent at an angle of incidence of less than 90°.

15. The process of claim 12, wherein the drops of the ionically cross-linkable material are directed into contact with the surface of the flowing stream of the ionic cross-linking agent at an angle of incidence ranging between 5° and 45°.

16. The process of claim 12, wherein said ionically cross-linkable material is an alginate salt and said ionic cross-linking agent is a calcium ion solution.

17. The process of claim 12, wherein the drops of the ionically cross-linkable material comprise two layers, the inner of which contains cells of microorganisms and the outer of which is essentially free of such cells.

18. The process of claim 12, wherein the ionically cross-linkable material contains a microorganism for alcoholic fermentation.

19. The process of claim 12, wherein the size of the solid particles is between 10 μm and 4 mm.

20. The process of claim 12, wherein after separation in step (e) from the flowing stream of the ionic cross-linking agent, the solid particles are contacted with a washing solution to remove traces of the ionic cross-linking agent from the surfaces of said particles.

21. The process of claim 12, wherein the ionically cross-linkable material comprises an aqueous solution containing from 1.0% to 1.8% by weight of an alkali metal or ammonium alginate, and the ionic cross-linking agent comprises an aqueous solution containing from 6% to 15% by weight of calcium chloride.

22. The process of claim 12, wherein after separation in step (e) from the flowing stream of the ionic cross-linking agent, the solid particles are contacted with a washing solution to remove traces of the ionic cross-linking agent from the surfaces of said particles, and the period of time, calculated from contacting the cross-linkable material with the cross-linking agent in step (d) up to contacting the solid particles with said washing solution, is controlled to adjust the cross-linking time.

23. An apparatus for manufacturing solid, unagglomerated particles of materials hardened by cross-linking, which comprises:

(a) means for providing an ionically cross-linkable material initially in liquid form;

(b) means for providing an ionic cross-linking agent capable of continuous flow;

(c) means for generating a freely flowing stream of the ionic cross-linking agent in an essentially vertical, downward direction over a predetermined length until said flowing stream reaches a terminal downstream end, and said flowing stream having a downwardly directed exposed outer surface along substantially the full length of said flowing stream including said terminal downstream end;

(d) means for generating drops of the ionically cross-linkable material;

(e) means for contacting the drops of the ionically cross-linkable material with the flowing stream of the ionic cross-linking agent such that said drops flow essentially vertically downward in contact with said flowing stream for a period of time effective to cross-link and harden the outer layers of said drops to form said particles; and (f) means for separating said solid particles from contact with the flowing stream of the cross-linking agent immediately after said particles are formed and at no lower than the terminal downstream end of said flowing stream.

24. The apparatus of claim 23, wherein the means for directing the drops of the ionically cross-linkable material into contact with the flowing stream of the ionic cross-linking agent is designed to impinge the drops on the stream at an angle of incidence of less than 90°.

25. The apparatus of claim 23, wherein the means for directing the drops of the ionically cross-linkable material into contact with the flowing stream of the ionic cross-linking agent is designed to impinge the drops on the stream at an angle of incidence of between 5° and 45°.

26. The apparatus of claim 23, wherein the means for generating the drops of ionically cross-linkable material comprises pulverization means, and including means for supplying the ionically cross-linkable material to the pulverization means.

27. The apparatus of claim 23, wherein the means for generating the drops of the ionically cross-linkable material comprises vibrating means.

28. The apparatus of claim 23, wherein the means for separating the solid particles from the ionic cross-linking agent stream comprises a filter having meshes for retaining the solid particles formed and permitting the ionic cross-linking agent stream to pass therethrough.

29. The apparatus of claim 28, wherein the filter is a conveyor belt in a form of a grid.

30. The apparatus of claim 29, wherein the conveyor belt is inclined upwardly so that the solid particles are displaced upwardly.

31. The apparatus of claim 23, further comprising washing means for removing traces of the ionic cross-linking agent from the surfaces of said particles.

32. The apparatus of claim 31, wherein the means for separating solid particles from the ionic cross-linking agent stream comprises a filter having meshes for retaining the solid particles formed and permitting the ionic cross-linking agent stream to pass therethrough.

33. The apparatus of claim 29, further comprising means for controlling the speed of the conveyor belt to regulate the cross-linking time of the cross-linkable material.

34. The apparatus of claim 23, wherein the drop generating means comprises a double nozzle constituted by two concentric tubes defining orifices, and separate means for supplying a first solution of an ionically cross-linkable material through an inner orifice and for supplying a second solution of an ionically cross-linkable material through an outer orifice.

35. An apparatus for manufacturing solid, unagglomerated particles of materials hardened by cross-linking, which comprises:

(a) means for providing an ionically cross-linkable material initially in liquid form;

(b) means for providing an ionic cross-linking agent capable of continuous flow;

(c) means for generating a freely flowing stream of the ionic cross-linking agent in a downward direction over a predetermined length until said flowing stream reaches a terminal downstream end, and said flowing stream having a downwardly directed exposed outer surface along substantially the full length of said flowing stream including said terminal downstream end;

(d) means for generating drops of the ionically cross-linkable material and for directing the drops into contact with the outer surface of the flowing stream of the ionic cross-linking agent such that said drops flow downward in contact with said flowing stream to form the solid particles through ionic cross-linking within essentially a fraction of a second after the drops contact the surface of the flowing stream; and (e) means for separating said solid particles from contact with the flowing stream immediately after the particles are formed within said essentially a fraction of a second.

36. The apparatus of claim 35, wherein the means for directing the drops of the ionically cross-linkable material into contact with the flowing stream of the ionic cross-linking agent is designed to impinge the drops on the stream at an angle of incidence of less than 90°.

37. The apparatus of claim 35, wherein the means for directing the drops of the ionically cross-linkable material into contact with the flowing stream of the ionic cross-linking agent is designed to impinge the drops on the stream at an angle of incidence of between 5° and 45°.

38. The apparatus of claim 35, wherein the means for generating the drops of ionically cross-linkable material comprises pulverization means, and including means for supplying the ionically cross-linkable material to the pulverization means.

39. The apparatus of claim 35, wherein the means for generating the drops of the ionic cross-linkable material comprises vibrating means.

40. The apparatus of claim 35, wherein the means for separating the solid particles from the ionic cross-linking agent stream comprises a filter having meshes for retaining the solid particles formed and permitting the ionic cross-linking agent stream to pass therethrough.

41. The apparatus of claim 35, wherein the filter is a conveyor belt in a form of a grid.

42. The apparatus of claim 41, wherein the conveyor belt is inclined upwardly so that the solid particles are displaced upwardly.

43. The apparatus of claim 35, further comprising washing means for removing traces of the ionic cross-linking agent from the surfaces of said particles.

44. The apparatus of claim 43, wherein the means for separating solid particles from the ionic cross-linking agent stream comprises a filter having meshes for retaining the solid particles formed and permitting the ionic cross-linking agent stream to pass therethrough.

45. The apparatus of claim 41, further comprising means for controlling the speed of the conveyor belt to regulate the cross-linking time of the cross-linkable material.

46. The apparatus of claim 35, wherein the drop generating means comprises a double nozzle constituted by two concentric tubes defining orifices, and separate means for supplying a first solution of an ionically cross-linkable material through an inner orifice and for supplying a second solution of an ionically cross-linkable material through an outer orifice.

* * * * *